United States Patent [19]

Hughes-Hartogs

[11] Patent Number: 5,652,782
[45] Date of Patent: Jul. 29, 1997

[54] DIGITAL TELEPHONE OVERCOMING INTERNATIONAL INCOMPATIBILITIES

[75] Inventor: Dirk Hughes-Hartogs, Morgan Hill, Calif.

[73] Assignee: Canon Inc., Tokyo, Japan

[21] Appl. No.: 444,192

[22] Filed: May 18, 1995

Related U.S. Application Data

[63] Continuation of Ser. No. 143,861, Oct. 27, 1993.

[51] Int. Cl.$^6$ .............. H04M 3/22; H04M 1/62; H04J 3/22; H04J 15/00
[52] U.S. Cl. .............. 379/27; 379/28; 341/138; 370/202; 370/466; 375/249
[58] Field of Search .............. 379/27, 28, 97, 379/98, 400, 406, 410, 411; 370/7, 58.2, 79, 99, 84, 118, 202, 360, 466, 465, 476, 477; 341/138; 375/249, 250, 251

[56] References Cited

U.S. PATENT DOCUMENTS

| | | | |
|---|---|---|---|
| 4,495,620 | 1/1985 | Steele | 375/122 |
| 4,595,907 | 6/1986 | Huffman | 370/99 |
| 4,620,294 | 10/1986 | Leung | 379/98 |
| 4,658,398 | 4/1987 | Hsing | 370/62 |
| 4,661,946 | 4/1987 | Takahashi | 370/58 |
| 4,805,167 | 2/1989 | Leslie et al. | 370/84 |
| 4,823,342 | 4/1989 | Morita | 370/58.1 |
| 4,850,011 | 7/1989 | Delmege | 379/201 |
| 4,903,247 | 2/1990 | Van Gerwen | 379/411 |
| 4,912,758 | 3/1990 | Arbel | 379/411 |
| 5,033,062 | 7/1991 | Morrow | 379/97 |
| 5,050,005 | 9/1991 | Kagami | 358/434 |
| 5,150,048 | 9/1992 | McAuliffe et al. | 324/158 |
| 5,172,410 | 12/1992 | Chace | 379/400 |
| 5,195,132 | 3/1993 | Bowker et al. | 379/410 |
| 5,239,542 | 8/1993 | Breidenstein | 370/79 |
| 5,243,342 | 9/1993 | Kattemalalavadi | 375/25 |
| 5,265,127 | 11/1993 | Betts | 375/39 |
| 5,274,703 | 12/1993 | Haughton | 379/400 |
| 5,392,284 | 2/1995 | Sugiyama | 370/84 |

FOREIGN PATENT DOCUMENTS

| | | | |
|---|---|---|---|
| 0 447 212 A1 | 3/1991 | European Pat. Off. | H04N 7/14 |
| 0 473 116 A2 | 8/1991 | European Pat. Off. | H04N 1/00 |
| 58-164396 | 9/1983 | Japan | H04Q 11/04 |
| 1109945 | 4/1989 | Japan | H04M 1/00 |
| 2026426 | 1/1990 | Japan | H04B 14/04 |
| 2192254 | 7/1990 | Japan | H04M 1/00 |
| 3101315 | 4/1991 | Japan | H03M 1/38 |
| 4129465 | 4/1992 | Japan | H04M 11/00 |
| 4225650 | 8/1992 | Japan | H04L 29/00 |
| WO93/23809 | 11/1993 | WIPO | G06F 13/00 |

OTHER PUBLICATIONS

Fascicle III.4—Rec. G.711, *Pulse Code Modulation (PCM) of Voice Frequencies* (Geneva 1972; further amended).

*Primary Examiner*—Curtis Kuntz
*Assistant Examiner*—Vijay Shankar
*Attorney, Agent, or Firm*—Fenwick & West LLP

[57] ABSTRACT

A digital telephone (60) comprises send equipment (40) and receive equipment (50), coupled via a signal splitter/combiner (61) onto a digital telephone line (62) for communication with a remote party (90). The send equipment (40) comprises an A-law map (12) and a mu-law map (43). Receive equipment (50) comprises an inverse A-law map (14) and an inverse mu-law map (52). Maps (12,43) are selectable by the user (80). Similarly, inverse maps (14,52) are also selectable by the user (80). Each of send equipment (40) and receive equipment (50) may further comprise an un-quick-fix module (45) for removing unwanted insertions of quick fixes (25) inserted into the telephone line (62) by international telephone companies. Receive equipment (50) may further comprise a digital signal processor (57), computer (56), a set of prestored templates (58) corresponding to possible incoming telephone characteristics, and a caller parameter decipher module (51).

6 Claims, 3 Drawing Sheets

DIGITAL TELEPHONE OVERCOMING INTERNATIONAL INCOMPATIBILITIES

RELATED APPLICATIONS

This is a continuation of co-pending U.S. patent application Ser. No. 08/143,861 filed on Oct. 27, 1993.

TECHNICAL FIELD

This invention pertains to the field of digital telephone communications, and particularly to apparatus and methods for overcoming incompatibilities in international digital telephone standards.

BACKGROUND ART

Background references include the following U.S. Pat. Nos.: 4,805,167; 5,050,005; and 5,150,048. The CCITT standard entitled "Recommendation G.711—Pulse Code Modulation (PCM) of Voice Frequencies" (Geneva 1972) illustrates the operation of A-law and mu-law. A partial solution to A-law/mu-law incompatibility has been introduced by certain international carriers and is subsequently described. In addition, the idea of making a telephone transmission "better" or "more pleasing" has been implemented by AT&T in "True Voice", in which the lower voice frequencies are accentuated and the overall signal is amplified 4 dB (U.S. Pat. No. 5,195,132).

DISCLOSURE OF INVENTION

This invention minimizes or removes flaws introduced in a telephone signal as a result of the signal being processed by telephone companies.

The present invention is a digital telephone (60) comprising send equipment (40) and receive equipment (50). The send equipment (40) comprises an A-law map (12) and a mu-law map (43). The receive equipment (50) comprises an inverse A-law map (14) and an inverse mu-law map (52).

The user (80) can overcome incompatibility between a first telephone system using A-law and a second telephone system using mu-law when communicating with a remote party (90), by means of determining the law that the remote party (90) is using, and selecting at the user digital telephone (60) a pair of maps (12,14 or 43,52) corresponding to the law used by the remote party (90).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
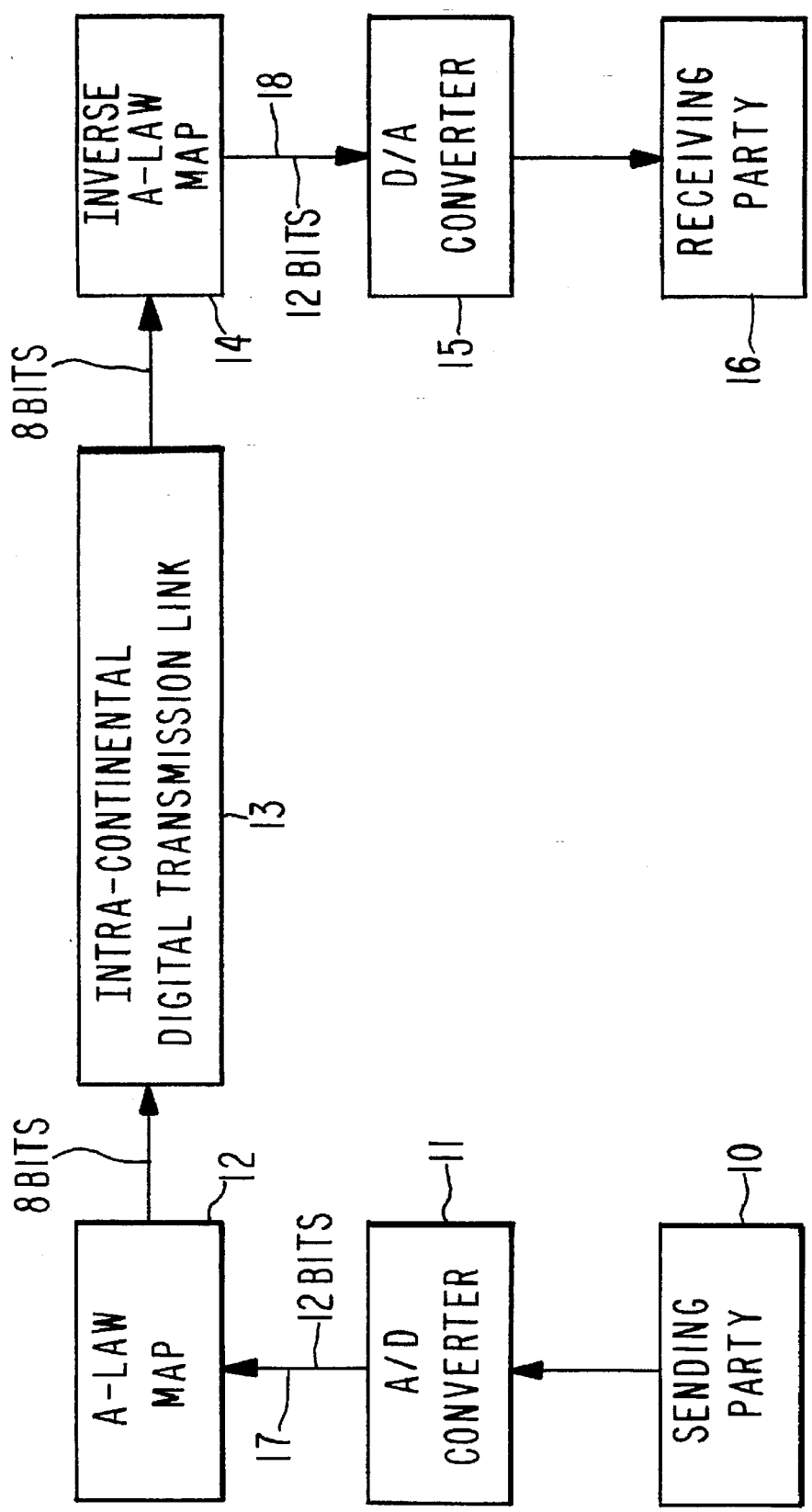
FIG. 1 is a block diagram illustrating a system for handling intracontinental digital telephone calls.

FIG. 1 illustrates the existing system for handling digital telephone communications in Europe. It is assumed that the sending party 10 is equipped with a conventional analog telephone. The analog signals emanating from the sending party 10 are converted by a (typically 12-bit) analog-to-digital (A/D) converter 11. The output of converter 11 is fed to a non-linear (monotonic and approximately logarithmic) map 12 of the digitized value to an 8-bit representation. This map 12 is called the A-law, the standard in place in Europe as promulgated by international political authorities. The A-law is defined in the aforecited CCITT reference. 8,000 of these 8-bit representations are transmitted every second via an intracontinental digital transmission link 13.

It is assumed that the receiving party 16 is similarly equipped with a conventional analog telephone. The 8 bits emanating from digital transmission link 13 are converted by an inverse A-law map 14 back to a 12-bit format, whereupon they are converted to analog form by digital-to-analog (D/A) converter 15 and processed by the equipment at the receiving party 16. Inverse A-law map 14 is also an invariant map promulgated by the CCITT. Converters 11 and 15 have 8,000 per second sampling rates, according to the international standard.

In general, the 12-bit stream 17 leaving converter 11 is not identical to the 12-bit stream 18 entering converter 15. However, the average of the values on bit stream 17 is equal to the average of the values on bit stream 18. The values on bit stream 18 are typically chosen from a smaller set than the values on bit stream 17, i.e., there is less resolution in bit stream 18 than in bit stream 17. This is due to the nature of the A-law map 12 and the inverse A-law map 14: A-law map 12 is logarithmic, because it was designed with the goal of maintaining the signal to noise ratio at between 30 dB and 35 dB over a wide dynamic range. The reason for this is to roughly equalize the perceived distortion for speakers who speak at different volume levels (from loud to whisper) for various types of user equipment 10,16.

Noise or distortion is unfortunately introduced because of the digitization process, and more particularly because the 8-bit representation describes only a subset of all the 12-bit values 17 resulting from the digitization by converter 11.

FIG. 1 illustrates the A-law which is in place in Europe. In the United States and Japan, on the other hand, a different law is used for converting from the 12-bit representation to the 8-bit representation. This law is called the mu-law, and is likewise defined in said CCITT reference. The A-law and the mu-law are not compatible. Therefore, connections between users 20,30 (FIG. 2) crossing the mu-law/A-law boundary result in distortion of the telephone signal. If these differences are ignored, and the values of one system are decoded using the decoding map of the other system, the result is a shift in signal level and distortion of small signals.

Figure 2:
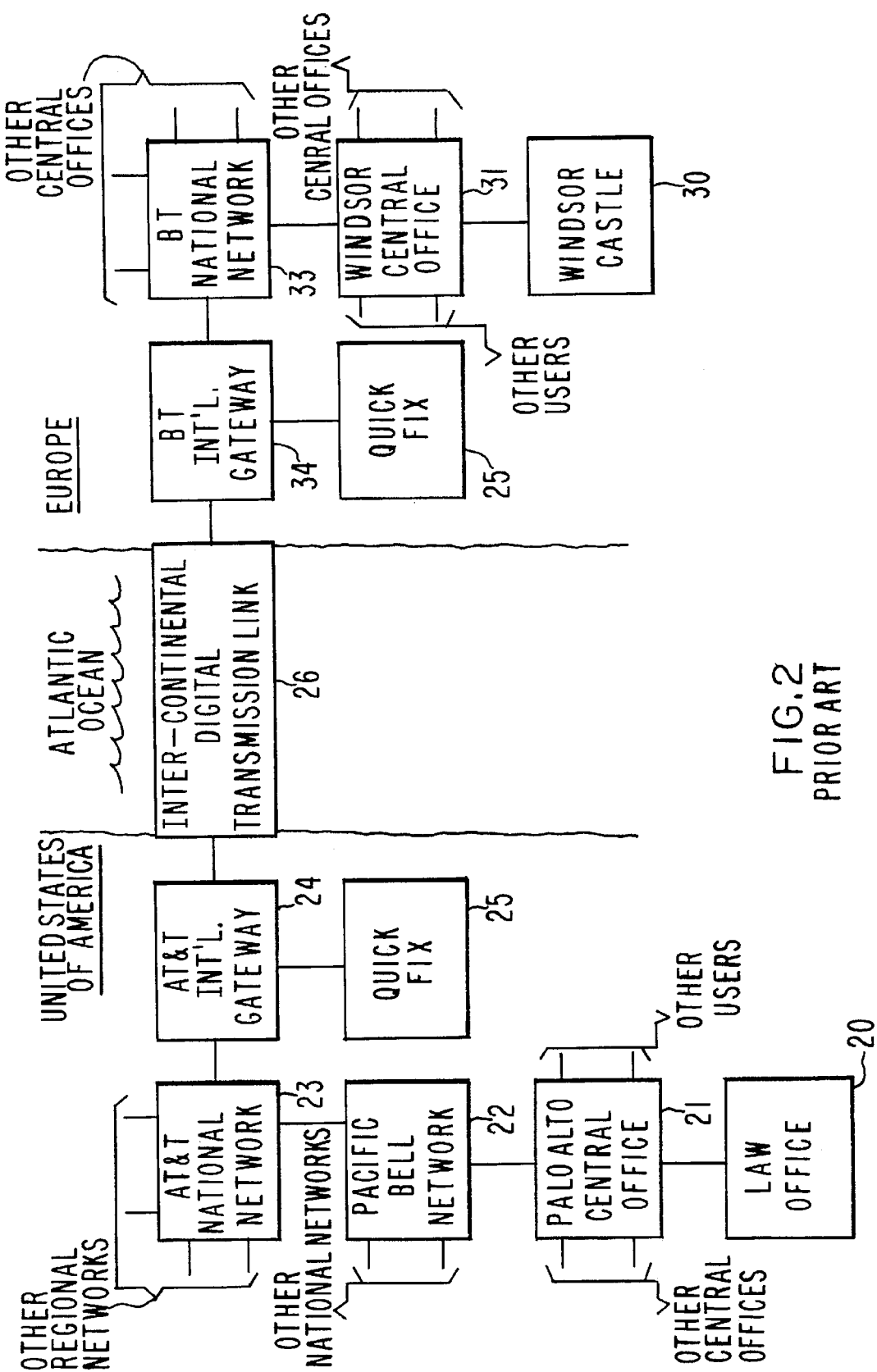
FIG. 2 is a block diagram illustrating a system for handling intercontinental digital telephone calls.

FIG. 2 illustrates such a system where an intercontinental digital transmission link 26 is used to convey digital telephone signals from the U.S.A. to Europe and vice versa. Link 26 may be a cable underneath the Atlantic Ocean or a satellite link, for example. At either end of link 26 is an international gateway. For purposes of illustration, FIG. 2 shows these to be an AT&T international gateway 24 in the case of the United States, and a British Telecom international gateway 34 in the case of Europe. Signals from each international gateway 24,34 are fed to a national network. FIG. 2 illustrates this as being the AT&T national network 23 in the case of the United States, and the British Telecom national network 33 in the case of Europe.

National network 23 connects several regional networks, including Pacific Bell network 22. Pacific Bell network 22 connects to other national networks, such as MCI and Sprint, which are interexchange carders similar to AT&T and with their own international gateways and intercontinental digital transmission links. Pacific Bell network 22 also connects to a plurality of central offices in various cities served by the regional network 22, for example, the illustrated Palo Alto, Calif. central office 21, one of two such central offices located in the bustling metropolis of Palo Alto. Central offices 21 are interconnected through the regional network 22 and sometimes directly.

A law office 20 in Palo Alto, Calif. is illustrated as being one of the many users that is connected to the Palo Alto central office 21, in this case via one to two miles of wires on telephone poles.

In England, there are no regional telephone networks. Rather, national network 33 is connected to a plurality of interconnected central offices including Windsor central office 31 as illustrated in FIG. 2. Windsor Castle 30 is one of a plurality of users coupled to Windsor central office 31, in this case by several miles of telephone wires on poles. The Windsor central office 31 is also connected directly to a plurality of other central offices.

Relatively sophisticated international telephone companies use what will be referred to herein as a "quick fix" 25 for attempting to overcome the incompatibilities between the A-law and the mu-law. The "quick fix" 25 is a new map which maps from each value in one system to the closest value of the other system, then converts each sample by adding a positive or negative integer, normally +1, 0, or −1. This method is sanctioned by the CCITT and is defined in Tables 3 and 4 of the aforecited CCITT reference. However, this quick fix 25 fails to remove all the distortion, and is rather expensive, since the quick fix 25 has to be added to each international telephone call that crosses the A-law/mu-law incompatibility boundary.

Figure 3:
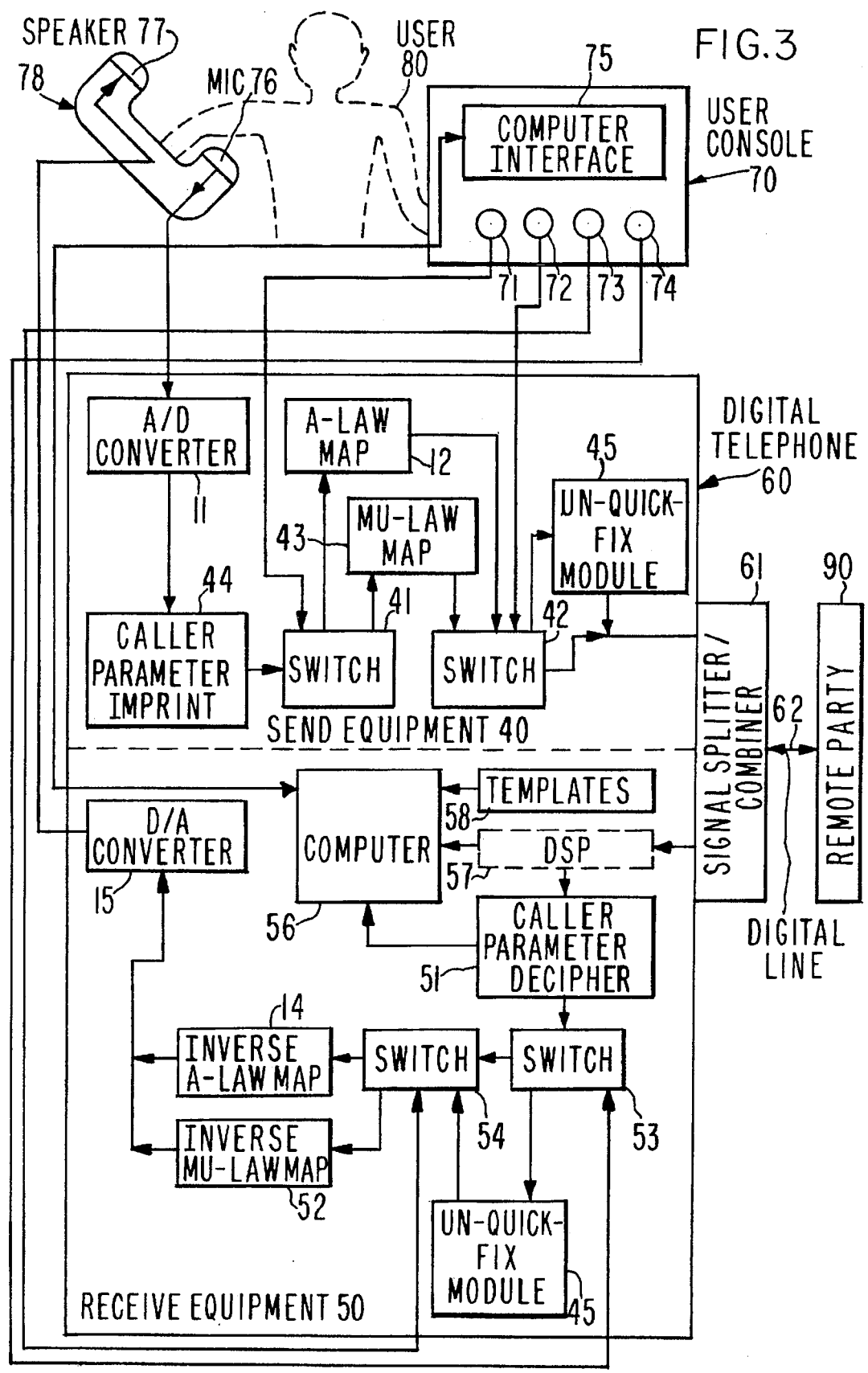
FIG. 3 is a block diagram illustrating digital telephone 60, user console 70, and handset 78 of the present invention.

FIG. 3 illustrates a preferred embodiment of the present invention, which remedies the aforementioned incompatibilities in international telephone systems. Digital telephone 60 is located at the last (in the direction of user 80) point in the digital link 62 that emanates from the remote party 90. Telephone 60 may be an ISDN (Integrated Services Digital Network) telephone.

The equipment available to user 80 comprises digital telephone 60, handset 78, and console 70. Digital telephone 60, user console 70, and handset 78 may be separate units or they may be combined into one or two units. Digital telephone 60 comprises send equipment 40 and receive equipment 50, linked together by signal splitter/combiner 61 for coupling to digital line 62 on the way to remote party 90.

User console 70 is coupled to digital telephone 60 and Comprises a computer interface 75, e.g., a video display for communicating the contents of computer 56 to user 80. User console 70 also comprises a set of four user activated binary switches 71,72,73, and 74.

Handset 78 is coupled to digital telephone 60 and comprises analog microphone 76 and analog speaker 77.

Microphone 76 is coupled to analog-to-digital (A/D) converter 11 within send equipment 40. The output of A/D converter 11 is fed to a caller parameter imprint module 44, where various characteristics of the sender 80 can be sent to the remote party 90. For example, caller parameter imprint module 44 may impress upon the digital telephone line 62 the telephone number of user 80, whether user 80 is using A-law or mu-law, etc.

The output of caller parameter imprint module 44 is fed to a first binary switch 41, which selectively switches either A-law map 12 or mu-law map 43 into the digital line 62. Switch 41 is controlled remotely by manually operated switch 71 on user console 70. The output from either A-law map 12 or mu-law map 43 is fed to switch 42, a binary switch which selectively switches un-quick-fix module 45 into or out of the digital line 62. Switch 42 is activated remotely by manually operated switch 72 on user console 70.

The purpose of un-quick-fix module 45 is to reverse the quick fix 25 when it is known or suspected that an international telephone company has used a quick fix module 25 as part of the link between user 80 and remote party 90. Thus, instead of adding the integer that is added by quick fix 25, the conversions introduced by the quick fix module 25 are reversed by subtracting the same integers from the digital representation of the information being sent. Because there are certain output values that have associated therewith two rather than one input value, the reverse map may not be unique, and randomization or noise shaping may be needed to complete the operation. Alternatively, for such ambiguous values, un-quick-fix module 45 can be designed to subtract an amount equal to the average (arithmetic or geometric) of the two amounts that would normally be added for the two input signals.

Alternative to a human user 80 and analog handset 78, user 80 could be a piece of digital equipment such as a computer (e.g., computer 56) or a facsimile machine. In this case, A/D converter 11 and D/A converter 15 would not be necessary.

Also coupled to the incoming digital line 62 may be a caller parameter decipher module 51, which is capable of extracting caller parameter information that may have been impressed on the incoming signal 62. If present, this information is fed to computer 56, which places it into a format that is useful to the user 80, such as a video output on computer interface 75. Caller parameter decipher module 51 may not tell the receiver 50 which encoding format and modifications were used by the caller 90. Therefore, within receive equipment 50, the signal arriving from splitter/combiner 61 may be fed into a digital signal processor (DSP) 57 which may include a spectrum and/or statistical analyzer. Digital signal processor 57 may be already present in the digital telephone 60. DSP 57 can calculate spectrum, distortion, intermodulation, power, etc.

The purpose of the (optional) spectrum and/or statistical analyzer is to sample a portion of the incoming signal 62, such as a header portion, to try to determine certain characteristics of said signal, for example, whether A-law or mu-law is used on the incoming signal 62, and whether a quick fix 25 has been inserted onto said signal 62 by an international telephone company. The output of the spectrum analyzer is fed to computer 56, which compares the analysis of said portion of said signal provided by the spectrum analyzer with a set of prestored templates 58 corresponding to certain signal characteristics. For example, the set of templates 58 may comprise four templates, corresponding to the following four signals: a first signal in which A-law has been used with no quick fix; a second signal in which A-law has been used with a quick fix; a third signal in which mu-law has been used with no quick fix; and a fourth signal in which mu-law has been used with a quick fix. Computer 56 compares the inputs from templates 58 and the spectrum analyzer, and informs user 80 by means of computer interface 75 which of the prestored templates 58 most closely resembles the signal analyzed by the spectrum analyzer. This comparison may be performed by conventional techniques well known to those of ordinary skill in the art. Distortion measures and signal-to-noise ratio may also be used, and the process may be automated to exclude direct participation by user 80. If included, the statistical analyzer simply builds a histogram of received values and determines if particular values are over- or under-represented.

Un-quick-fix module 45 is selectively switched into the incoming digital telephone line 62 by means of switch 53, a binary switch remotely triggered by manually operated switch 74 on user console 70. The purpose of un-quick-fix module 45 is to reverse the effects of the insertion of a quick fix module 25 when it is known or suspected that an international telephone company has inserted quick fix 25 into the incoming signal.

The incoming digital telephone signal is then coupled to either inverse A-law map 14 or inverse mu-law map 52, by means of binary switch 54 which is activated remotely by manually operated switch 73 on user console 70. The digital signal is then coupled through digital-to-analog converter 15 to speaker 77 within handset 78.

The equipment in FIG. 3 provides great flexibility in removing the problem of incompatibility between international telephone systems. For example, if the remote party 90 is calling user 80, there are several means available to user 80 to determine how to remove the incompatibilities. For example, if remote party 90 is using caller ID, caller parameter decipher module 51, in conjunction with computer 56, can decipher the caller ID and possibly determine whether A-law or mu-law is being used. User 80 can then activate switch 73 to make the correct selection between inverse A-law map 14 and inverse mu-law map 52. User 80 can also make an adjustment in send equipment 40 as well as receive equipment 50, by activating switch 71 to make the selection of A-law map 12 versus mu-law map 43, according to which law party 90 is using. Alternatively, the spectrum analyzer within DSP 57 may determine which law is being used, for example by measuring distortion on the modem tone by evaluating a predetermined test pattern that has been sent by remote party 90. As a third alternative, party 90 can tell user 80 which law he is using, and user 80 can activate the appropriate switches 71,73. The system may be automated so that computer 56 performs most or all of the functions that user 80 would otherwise perform. For example, computer 56 can be made to send signals over microphone 76 and to activate switches 71–74.

Similarly, when user 80 (or computer 56) originates the call, he (or she or it) will know what number he is dialing and therefore know the country of remote party 90, and thus know which law remote party 90 conventionally uses. User 80 (or computer 56) may then activate switch 73 to select the law 14,52 corresponding to that knowledge. He may also decide to switch to that same law 12,43 within his send equipment 40, despite the fact that he is not normally on that law, in order to help the remote party 90, who may not have as sophisticated a digital telephone 60 as does user 80.

If both user 80 and remote party 90 are equipped with the sophisticated digital telephone 60 illustrated in FIG. 3, they may decide to use just A-law or just mu-law or even a third system, such as in accordance with CCITT G.728 (7 kHz voice), in both their send and receive units 40,50 even if they are in countries using different laws.

In all of the above cases, the parties 80,90 still may need to determine whether one of the international telephone companies processing the connection has inserted a quick fix 25 or not. They may make this determination either by trial and error, i.e, trying various combinations of switches 72,74 to see which combination yields the best results; or they may make this determination by using spectrum or statistical signal analyzer within DSP 57 in conjunction with computer 56 and templates 58. If a quick fix 25 is in place, one and only one of the parties 80,90 should switch his un-quick-fix module 45 into the connection.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, laws other than A-law and mu-law can be employed.

What is claimed is:

1. A digital telephone adapted to reduce distortion introduced by telephone company conversion of A-law to mu-law (or mu-law to A-law), said digital telephone comprising, at the same location:

send equipment;

receive equipment; and a linker for coupling the send equipment and the receive equipment to an external transmission line; wherein said send equipment comprises an A-law map and a mu-law map;

said receive equipment comprises an inverse A-law map and an inverse mu-law map; and each of said A-law map and said mu-law map converts a digital representation of a signal from a given resolution to a coarser resolution; wherein the send equipment further comprises a first switch for selectively switching between the A-law map and the mu-law map; and the receive equipment further comprises a second switch, independent of the first switch, for selectively switching between the inverse A-law map and the inverse mu-law map.

2. The digital telephone of claim 1 wherein the send equipment further comprises a caller parameter imprint module coupled to the A-law map and to the mu-law map.

3. The digital telephone of claim 1 wherein the receive equipment further comprises a caller parameter decipher module coupled to the inverse A-law map and to the inverse mu-law map.

4. The digital telephone of claim 1 wherein the send equipment further comprises:

an un-quick-fix module coupled to the A-law map and to the mu-law map; and a third switch for selectively switching the un-quick-fix modules in and out of the digital telephone.

5. The digital telephone of claim 1 wherein the receive equipment further comprises:

an un-quick-fix module coupled to the inverse A-law map and to the inverse mu-law map; and a fourth switch for selectively switching the un-quick-fix module in and out of the digital telephone.

6. The digital telephone of claim 1 wherein the receive equipment further comprises:

a digital signal processor coupled to the inverse A-law map and to the inverse mu-law map;

a computer coupled to the digital signal processor; and a set of templates coupled to the computer, said templates corresponding to characteristics of incoming signals.

\* \* \* \* \*